United States Patent
Dauvois et al.

(10) Patent No.: US 7,454,618 B2
(45) Date of Patent: Nov. 18, 2008

(54) SYSTEM AND METHODS FOR TRANSMITTING ENCRYPTED DATA WITH ENCRYPTION KEY

(75) Inventors: Jean-Luc Dauvois, Paris (FR); Michel Maillard, Rambouillet (FR)

(73) Assignee: Nagra Thomson Licensing, Boulogne-Billancourt (FR)

( * ) Notice: Subject to any disclaimer, the term of this patent is extended or adjusted under 35 U.S.C. 154(b) by 558 days.

(21) Appl. No.: 10/472,201

(22) PCT Filed: Mar. 22, 2002

(86) PCT No.: PCT/FR02/01010

§ 371 (c)(1),
(2), (4) Date: Jan. 28, 2004

(87) PCT Pub. No.: WO02/080544

PCT Pub. Date: Oct. 10, 2002

(65) Prior Publication Data

US 2004/0114764 A1    Jun. 17, 2004

(30) Foreign Application Priority Data

Mar. 30, 2001   (FR) .................................. 01 04342

(51) Int. Cl.
*H04L 9/00* (2006.01)
*H04K 1/00* (2006.01)
(52) U.S. Cl. ....................... 713/171; 380/286
(58) Field of Classification Search .................. None
See application file for complete search history.

(56) References Cited

U.S. PATENT DOCUMENTS

| | | | | |
|---|---|---|---|---|
| 6,105,134 A | * | 8/2000 | Pinder et al. ................. | 713/170 |
| 6,157,606 A | * | 12/2000 | Inazawa et al. ............. | 369/116 |
| 6,157,719 A | * | 12/2000 | Wasilewski et al. ......... | 380/210 |
| 6,246,767 B1 | * | 6/2001 | Akins et al. .................. | 380/210 |
| 6,424,717 B1 | * | 7/2002 | Pinder et al. ................. | 380/239 |
| 6,535,607 B1 | * | 3/2003 | Chandersekaran et al. .. | 380/286 |
| 6,937,729 B2 | * | 8/2005 | Akins et al. .................. | 380/239 |
| 6,971,008 B2 | * | 11/2005 | Wasilewski et al. ......... | 713/168 |
| 7,185,205 B2 | * | 2/2007 | Launchbury et al. ........ | 713/189 |

(Continued)

FOREIGN PATENT DOCUMENTS

EP    0 984 629    3/2000

(Continued)

OTHER PUBLICATIONS

"Functional Model of a Conditional Access System" EBU Review-Technical, European Broadcasting Union. Brussels, BE, No. 266, Dec. 21, 1995, pp. 64-77.

*Primary Examiner*—Christopher A Revak
(74) *Attorney, Agent, or Firm*—Osha • Liang LLP

(57) ABSTRACT

A method for transmitting information between a transmitter station and a plurality of receiving stations in which encrypted information is transmitted from the transmitter station to the receiver station with a first key and at least a control message bearing a second key. The first key used for decryption is restored in each receiving station from the second key and from at least one datum selected from a set of data available in the receiving stations, according to a selection command periodically transmitted between the transmitting station and the receiving station. Such a system may find particular application to pay television.

17 Claims, 2 Drawing Sheets

U.S. PATENT DOCUMENTS

| | | | |
|---|---|---|---|
| 2001/0001014 A1 * | 5/2001 | Akins et al. | 380/241 |
| 2002/0087685 A1 * | 7/2002 | Lassen et al. | 709/225 |
| 2002/0108040 A1 * | 8/2002 | Eskicioglu | 713/172 |
| 2003/0174844 A1 * | 9/2003 | Candelore | 380/277 |
| 2004/0114764 A1 * | 6/2004 | Dauvois et al. | 380/277 |
| 2004/0255130 A1 * | 12/2004 | Henry et al. | 713/189 |
| 2004/0255145 A1 * | 12/2004 | Chow | 713/200 |
| 2005/0152545 A1 * | 7/2005 | Desmicht et al. | 380/210 |

FOREIGN PATENT DOCUMENTS

| | | | |
|---|---|---|---|
| WO | 99 07148 | | 2/1999 |
| WO | WO 99 07148 | * | 2/1999 |
| WO | WO 99/07148 | * | 2/1999 |
| WO | WO 02/077878 A1 | * | 10/2002 |

* cited by examiner

SYSTEM AND METHODS FOR TRANSMITTING ENCRYPTED DATA WITH ENCRYPTION KEY

The present invention relates to a system and a method for transmitting information in an encrypted form. It also relates to the transmission of an equally encrypted key and used for decrypting the information.

The invention may find applications in different fields of communications, but is in particular directed to the television service or program distribution networks, generally designated as "pay television".

STATE OF THE PRIOR ART

Encrypted transmission of information and notably of pay television programs or services occurs between a distributor's transmitting station and a plurality of receiving stations. The receiving stations essentially correspond to the television receiver sets of the users, equipped with a decoder.

The information, transmitted through a radio, optical or electrical channel is encrypted by means of a key in order to reserve its use to a certain number of subscribers or users, for which this information is intended. The users have a decoding equipment or a decoder, capable of restoring so-called clear information from the encrypted information. The clear information may be recorded or used in a television set for displaying images or reproducing sounds.

Information decryption in the receiving station occurs by using a key which should match the one used in the transmitting station for the encryption. The key must therefore also be transmitted to the users so as to be available in the receiving stations.

Different possibilities are provided for distributing an encryption/decryption to users or subscribers of a television program distributor. However, a simple solution consists of transmitting the key between the transmitting station and the receiving stations in the same way as the encrypted information.

For this purpose, the key itself should be encrypted in order to prevent its unauthorized use by users which have not taken out a suitable subscription.

Information transmitted between the transmitting station and the receiving stations thus comprises not only information as audio and/or video data, but also messages for controlling and handling user access to the information, accompanied by encryption/decryption keys.

The access control and handling messages provide access control to the broadcast information for one user or a plurality of users. These messages further enable different pieces of information to be reserved to different users or subscribers.

The appended FIG. 1 schematically illustrates the main components of a known information transmission system.

The components of a transmitting station are on the left hand portion of the figure and the components of a user's receiving station are on the right hand portion of the figure.

Some of these portions are connected by a broken line which symbolizes a remote transmission of information, for example through a radio channel.

A source of video and/or audio streams 102 is connected to a first encryption unit 104e of the transmitting station. This encryption unit uses an encoding key, marked as CW, for encrypting the video/audio stream. An identical encoding key CW is used in a decryption unit 104r of the receiving station. A television set 106 is connected to the decryption unit 104r.

A first key generator 108 is provided in the transmitting station for generating encoding keys CW. For instance, this is a random generator.

A second encryption unit 114e of the transmitting station is provided for encrypting the encoding key CW. The second encryption unit delivers encrypted pieces of information which are access control messages marked as ECM (Entitlement Control Message). The ECM messages contain the encrypted encoding key CW and descriptive information on the broadcast video or audio program. The ECM messages are received in the receiving stations and decoded therein by a second decryption unit 114r. The second decryption unit provides the encoding key CW required for the first decryption unit in order to decrypt the video/audio stream. Key CW is extracted from the ECM messages after their decryption.

Encryption of the ECM messages in the transmitting station, as well as their decryption in the receiving station occurs by means of another key designated as the operating key and marked as Kexp. The operating key for example is provided by a second key generator 118.

As the operating key should also be provided to a large number of users, a solution for its distribution consists of broadcasting it between the transmitting station and the receiving stations in the same way as the other information.

As this key should be reserved to certain users or subscribers, it is also encrypted by a third encryption unit 124e.

The third encryption unit delivers access handling messages marked as EMM (Entitlement Management Message). These messages contain in addition to the encrypted operating key, data for handling the rights of the users. With these data, the type of programs or broadcasts for which a subscription was taken, may be determined for example for each user or user group. The EMM messages are transmitted to the receiving stations and are decrypted therein by third decryption units 124r which provide the operating key Kexp to the second decryption units 114r.

The third encryption unit 124e of the transmitting station and the third decryption units 124r of the receiving stations use a key designated as customer key and marked as Kcl.

It should be noted that, if the encoding key CW and the ECM messages are shared by a large number of users, even by all the users, the EMM messages and the customer keys Kcl are specific to a unique user or to a restricted number of users.

Insofar as the EMM and ECM messages are broadcast through the same broadcasting channels as the video and audio information, problems of congestion of the transmission bandwidth available for these messages arise. The ECM messages, common to a large number of users, may be broadcast frequently and may therefore carry decoding keys which change rapidly. By rapidly changing the keys, it is possible to limit the risk of their copying for fraudulent use.

On the other hand, the EMM messages and the operating keys which they carry, are specific to much more limited groups of users, or intended for individual users. Hence, their frequent broadcast for each user and their rapid renewal are not possible in an allocated transmission bandwidth for transmitting information.

As an example, the coding key is generally changed with a period of a few seconds and the ECM messages are transmitted every second. The operating key is generally changed once a month and the EMM messages are transmitted once an hour. Finally, the customer keys Kcl are generally unchangeable.

In the receiving stations, a portion of the devices may be integrated into an electronic card of the chip card type. Such a card, for example, comprises the second and third decryption units and the means for handling the different keys. The customer key may be permanently written into the chip card. The operating and decoding keys may be temporarily stored therein until their renewal.

The chip cards of the receiving stations include for this purpose a microprocessor and memories for data storage. The memories notably provide storage for the decryption keys.

The information transmission system is not protected against unauthorized use consisting of copying one or several keys into a blank chip card.

Hacking of the chip card of the receiving stations may a priori be achieved at different stages, i.e. by using one of the various keys. Various constraints occur depending on circumstances.

Copying the customer key for receiving the EMM messages is linked to the risk that the counterfeiter will be identified. Indeed, the customer key and the EMM messages are specific to each user or to limited groups of users. It would therefore be possible for the broadcaster to prevent in the transmitting station the transmission of new EMM messages for these users.

On the other hand, the risk of identifying the dishonest user is impossible when the encoding keys CW are copied. However, this counterfeit work fails because of the lack of perenniality of these keys.

The main copying risk thus relates to the ECM messages which contain the operating key. As this key remains unchanged for a relatively long period, of the order of a month, its broadcast by a hypermedia system (Internet) would allow fraudulent use by a large number of users.

DESCRIPTION OF THE INVENTION

The object of the invention is to provide an information transmitting system and method for significantly reducing the risks of fraudulent use.

An object of the invention is also to increase the cost of a chip card aimed at fraudulently emulating the operation of a receiving station.

An object of the invention is further to preserve a maximum of transmission bandwidth for transmitting video and audio information by preventing its limitation by repeatedly sending messages or encryption keys.

In order to achieve these objects, the invention more specifically relates to a method for transmitting information between a transmitting station and a plurality of receiving stations wherein encrypted information with a first key and at least a (control) message bearing a second key are transmitted from the transmitting station to the receiving stations, and wherein the encrypted information is decrypted with the first key or a key substantially identical with the first key. According to the invention, the first key, or the key substantially identical with the first key, is established in the receiving stations from the second key and at least one datum selected from a set of data available in the receiving stations, according to a selection command periodically transmitted between the transmitting station and the receiving stations.

In the sense of the invention, information is understood as all data or signals able to be exchanged between a transmitting station and a receiving station. Accordingly, this may be both video or audio data, and codes or keys, or even control messages. Control messages for example, are messages used for describing the broadcast programs or services provided to the users and used for handling individual or collective access to these services by the users.

By the invention, at least one of the keys which is transmitted between the transmitting station and the receiving stations, is not a key which may be directly used for carrying out decryption. As shown above, the key which is suitable for decryption, i.e. the first key, is rebuilt in the receiving stations from the second key and from one or several data able to be selected from a set of additional data.

The data able to be selected are found in the receiving stations, for example they are found in the chip card, if a receiving station is equipped with such a card.

The fact that the selection of data taken into account for establishing the first key is renewed periodically and that it relates to a set of data much vaster than a simple key, the fraudulent copying of a chip card requires a memory capacity of the same order of size than the memory capacity available in the receiving stations. It also assumes the continuous updating of the set of data. These significant constraints tend to increase the cost of copied chip cards and of the fraudulent copying of the contents of the receiving stations.

According to a particular implementation of the invention, which tends to protect the system against any fraud relating to the sensitive operating key, owing to its relatively long renewal period, the transmitted pieces of information targeted by the invention, as defined above, are mainly access control messages ECM. As a reminder, these messages are carriers of the code key CW notably used for encryption and decryption of audio and video data.

The first key is then the operating key. The selection command used for selecting the data further required for forming the first key may be transmitted between the transmitting station and the receiving stations, whether encrypted or not. Indeed, it does not contain any information which may be exploited per se, i.e. besides the contents of all or part of the memories of the receiving stations.

In an other possible implementation of the invention which, moreover, does not exclude the one discussed above, the encrypted information targeted by the invention mainly includes video and/or audio data. In this case, the first key is the code key CW.

The invention also relates to a system for transmitting information between a transmitting station and a plurality of receiving stations. The system comprises in the transmitting station, at least one device for encrypting information with a first key and, in each receiving station, a decryption device according to the same key.

The transmission system operates according to the discussed method. For this purpose, each receiving station comprises means for establishing the first encrypted key from a second key transmitted from the transmitting station and from at least one datum selected from a set of stored data, according to a selection signal transmitted by the transmitting station.

According to the invention, and as already mentioned above, at least one of the keys, for example the operating key, is never transmitted between the transmitting station and the receiving stations. The key which is transmitted, in this case the second key, cannot be used as such for proceeding with the decryption.

When the first key is the operating key, the considered encrypted information includes access control messages (ECM) bearing a third key (CW) used for encrypting a stream of data comprising audio and/or video data.

According to another possibility, without excluding the previous one, the first key may also be a key for encrypting/decrypting audio and/or video data. In this case, the relevant encrypted information includes audio/video data.

The receiving stations may be designed in order to store a set of data capable of being selected in response to the selection command. These data may be totally or partly written in a fixed memory.

However, in a preferred embodiment of the transmission system, a part or the entire data capable of being selected, may be stored in a rewritable memory. This feature allows these data to be renewed and hence is an additional obstacle to the counterfeit of receiving stations.

The receiving station may further include selection means optionally including a table of pointers pointing to memory addresses.

The selection means may perform the selection in a direct way, for example, according to the addresses of the data to be selected, transmitted from the transmitting station or via a table of pointers specific to each receiving station. The pointers may then point to different addresses in the different receiving stations. In this case, data required for establishing the keys may not be stored at the same address in the different receiving stations, but they may be variably distributed in the entire memory allocated for storing these data. This feature also increases the difficulty of copying the contents of the receiving stations.

In addition, it is possible to distribute user identification data among the stored data whether capable of being selected or not. With these data, in the case of fraudulent copying, it is possible to identify the dishonest user and prevent operation of the corresponding receiving stations. Certain stations may be inhibited, for example by stopping the transmission of access handling messages EMM for these stations.

Other features and advantages of the invention will become apparent from the description which follows, with reference to the figures of the appended drawings. This description is given by way of pure illustration and as non-limiting.

DETAILED DESCRIPTION OF EMBODIMENTS OF THE INVENTION

Figure 1:
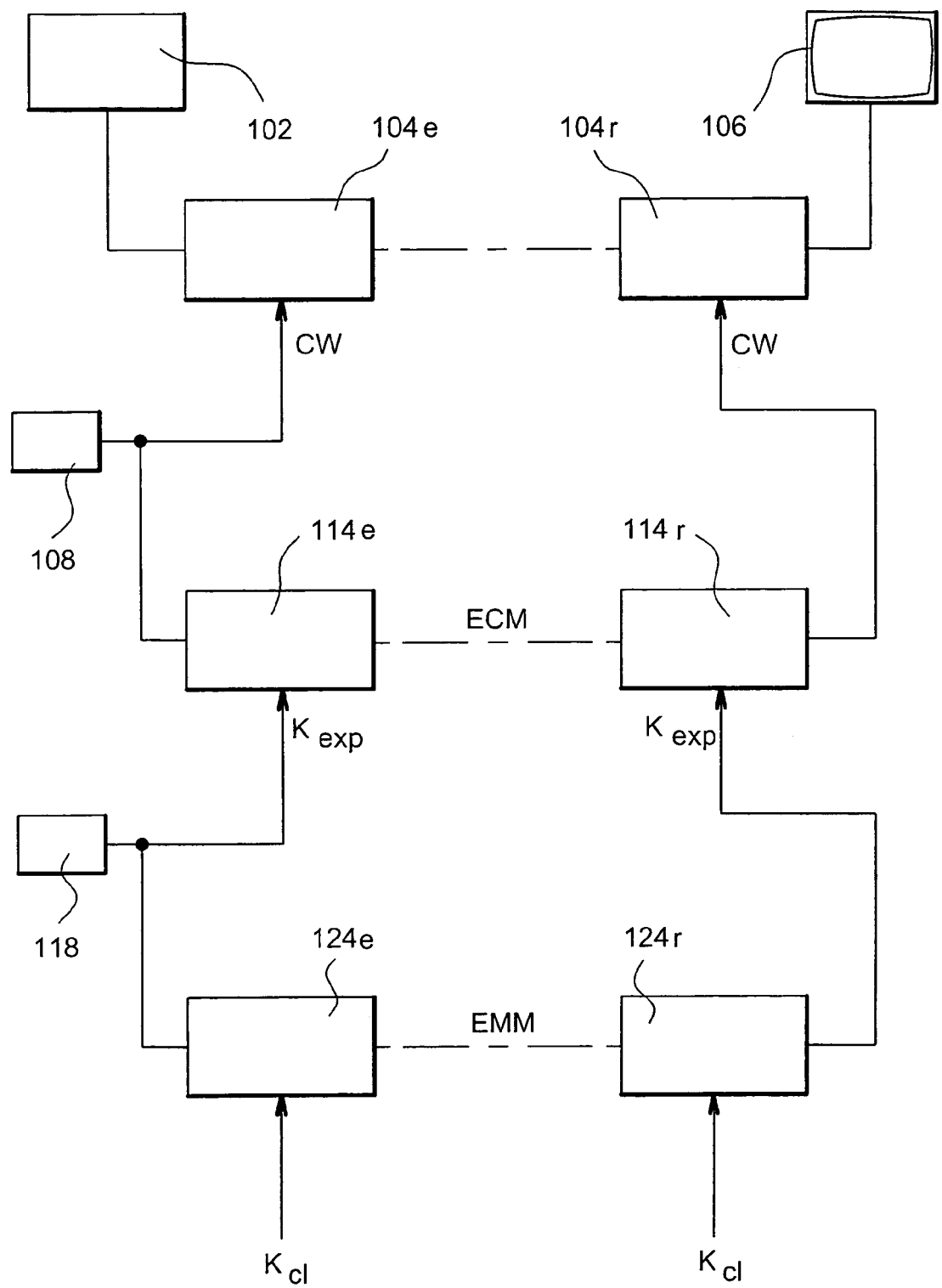
FIG. 1 already described, is a schematic and simplified illustration of a transmission system for encrypted information of a known type.
Figure 2:
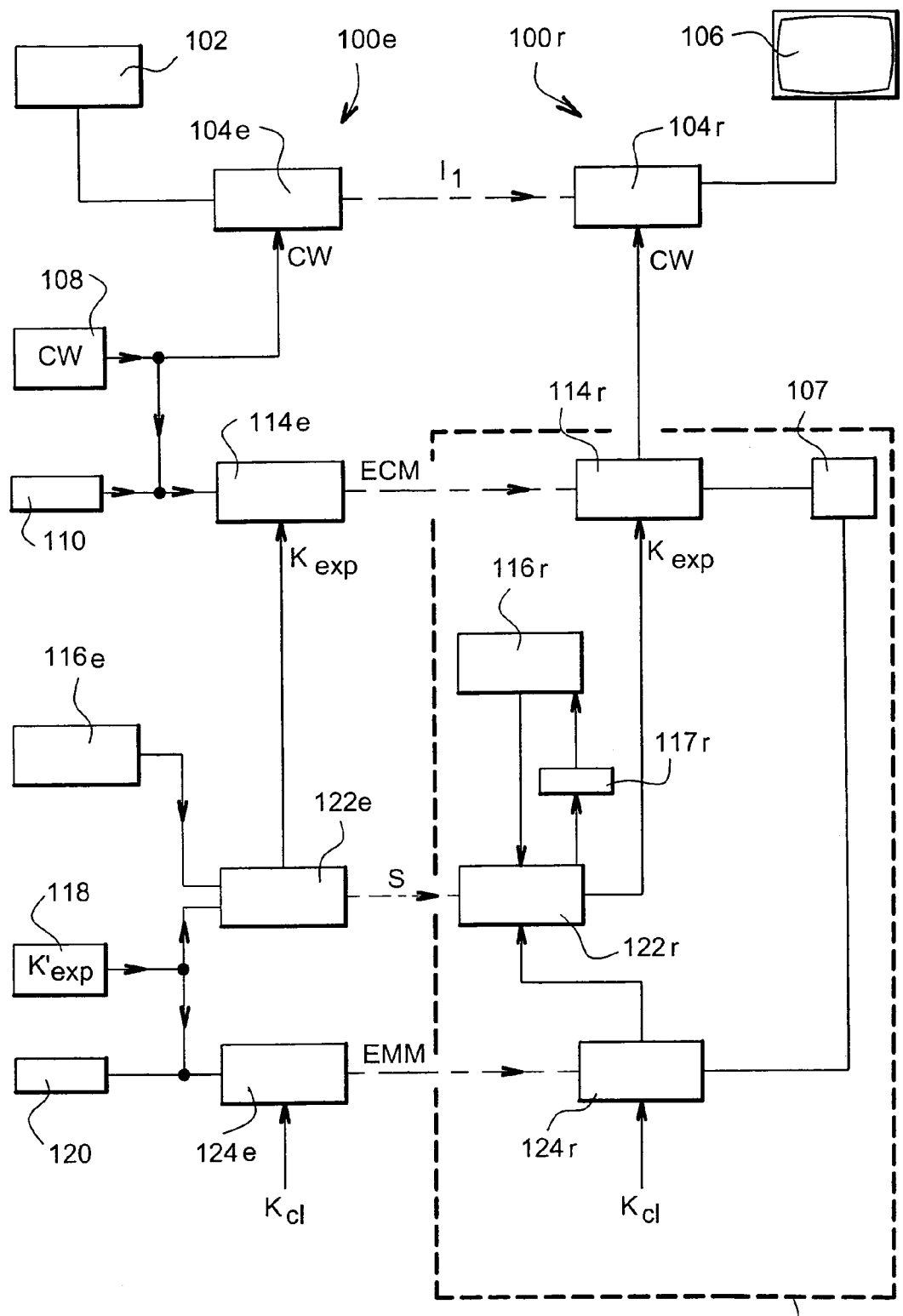
FIG. 2 is a schematic and simplified illustration of a transmission system for encrypted information, according to the invention.

In the description which follows, with reference to FIG. 2, components which are identical, similar, or equivalent to components already described in FIG. 1, are marked with the same reference numbers.

In particular, a source 102 of a video and/or audio stream from a transmitting station 100e of a distributor is recognized in FIG. 2. The station transmits a stream of encrypted information $I_1$, for example in the form of video or audio data, to a plurality of receiving stations 100r. For the sake of clarity, the figure only illustrates a single receiving station, which will be referred to in the text which follows. In pay television applications, the number of receiving stations is however very large and corresponds for example to the number of subscribers.

It should be specified that information other than audio and/or video data may be transmitted in the stream $I_1$. For instance, this may be interactive applications, timing data, programs, etc.

The transmitted information may be encrypted with an encryption unit 104e of the transmitting station and they may be decrypted by a decryption unit 104r of the receiving station 100r for example in order to be restored on a television set 106.

Encryption and decryption occur by using a code key, marked as CW by analogy with FIG. 1. The code key CW is generated by a generator 108. It is associated with an information descriptor stream $I_1$, provided by an unit 110, and then it is transmitted in an encrypted way as an ECM message. For example, the descriptor indicates the contents of a transmitted television program.

The ECM messages are also encrypted information in the sense of the invention. Reference may be made to the introductory part of the text for a more detailed description of ECM messages.

Encryption and decryption of ECM messages are performed in units 114e and 114r of the transmitting station and of the receiving station, respectively. Encryption and decryption occur by means of a so-called operating key marked as Kexp, by analogy with FIG. 1.

However, and unlike the system illustrated in FIG. 1, the operating key is not transmitted between the transmitting station and the receiving stations.

The operating key Kexp is built from a second operating key marked as K'exp, provided by a key generator 118, and from one or several data taken in a set of data stored in a memory 116e. The available data in the memory 116e are identical with a set of data stored in a memory 116r of each receiving station. It should be specified that memories 116e and 116r may be single memories or made up from different memories of different types (ROM, RAM, EEPROM etc.).

A computing unit 122e is provided for selecting the data in memory 116e and for combining these data with the second operating key K'exp in order to form the operating key Kexp for the encryption unit 114e. The combination may be summarized by a simple juxtaposition of data or it may be a more complex combination. Unit 122e also forms a selection command message S which for example contains the addresses of the selected data in the memory. This message S is transmitted to all the receiving stations in either an encrypted way or not.

Moreover, an encryption unit 124e receives the second operating key K'exp and data for handling the rights of the users provided by an unit 120. These data for handling rights describe for a particular user or a group of users, e.g. the type of program for which a subscription has taken out. The data for handling the rights and the second operating key K'exp are contained in EMM type messages.

As shown in FIG. 2, the selection command message S is received by a computer 122r of the receiving station. The computer 122r reads in from memory 116r, data according to the selection command S and combines these data with the second operating key K'exp in the same way as the computer 122e of the transmitting station, in order to form the operating key Kexp for the decryption unit 114r.

The selection command message, transmitted by the transmitting station to the receiving station, may contain an address or a set of addresses indicating the location of the memory 116r, for example, at which one datum used for forming the operating key should be read. In this case, the contents and the layout of at least one portion of the memory space should be identical in all the receiving stations.

However, according to an enhancement, the receiving stations may include a table of pointers 117 and the selection commands may designate one of the pointers of the table. This pointer may then be pointed towards different addresses in different receiving stations while finally obtaining the same data for forming the operating key. With this enhancement, it is possible to have apparently different memory contents in the different receiving stations or at the very least contents which are laid out differently. This increases the difficulty for copying them fraudulently.

According to another already mentioned enhancement, the contents of the memories may include data for identifying the user, which may be utilized for identifying a possible counterfeiter.

Finally, the transmitted EMMs between the transmitting station and the receiving stations may include data which are to be stored in memory 116r or data for replacing already existing data in memory 116r. These same data are also recorded in the transmitting station, for example in memory 116e, so that they may be used as data for establishing the operating key.

Reference 107 in FIG. 2 designates a test circuit capable of receiving ECM and/or EMM messages. This circuit is for checking for each user, his/her subscriber particulars for receiving the broadcast programs. Such a circuit known per se, may prohibit decryption of the information stream $I_1$ when EMM messages are no longer transmitted for a given user which will have been identified as an unauthorized user.

In the receiving stations, at least one portion of the components may be integrated into a chip card. In FIG. 2, a number of components are encircled by a broken line. For example, these components are part of a chip card 200. In particular, it is seen that the chip card 200 may include the customer key Kcl used for decryption of EMM messages. The latter may be stored or wired.

Fraudulent copying of the chip card requires the copying of all the data from the memory or from memories 116r. The capacity and the distribution of memories is for example the following: RAM: 32 kB, EEPROM: 32 kB, RAM: 1 kB. Furthermore, the contents of the EEPROM memory should be continuously updated and distributed by the counterfeiter to all the dishonest users, which represents a large data stream. These constraints make the copying of the chip card economically worthless or at the very least considerably reduce its benefit.

The invention claimed is:

1. A method for transmitting information between a transmitting station and at least one receiving station, comprising:
    transmitting information encrypted with a first key and at least a message bearing a second key, from the transmitting station to the at least one receiving station, and
    decrypting encrypted information in the at least one receiving station using one selected from a group consisting of a rebuilt version of the first key and a key substantially identical to the first key,
    wherein the one of the rebuilt first key and the key substantially identical to the first key that is used to decrypt the encrypted information is generated in the receiving stations using the second key and at least one datum selected from a set of data available in the receiving stations,
    wherein the at least one datum is selected according to a selection command periodically transmitted between the transmitting station and the receiving stations, wherein the selection command comprises a pointer referencing at least one memory address location of the at least one datum used to generate the one of the rebuilt first key and the key substantially identical to the first key.

2. The method according to claim 1, wherein the encrypted information includes an access control message bearing a third key used for encrypting a data stream comprising audio and/or video data.

3. The method according to claim 2, wherein the access control message is an access handling message encrypted by a fourth customer key.

4. The method according to claim 1, wherein the encrypted information includes audio and/or video data.

5. The method according to claim 1, wherein the selection command is transmitted without encryption.

6. The method according to claim 1, wherein the selection command is encrypted.

7. The method of claim 1, wherein the set of data stored in each of the receiving stations is periodically updated in the receiving stations such that the set of data from which the at least one datum is selected is periodically modified.

8. A system for transmitting information between a transmitting station and at least one receiving station comprising:
    the transmitting station comprising at least one information encryption device with a first key and configured to transmit encrypted information that is encrypted using the first key; and
    the at least one receiving station configured to receive transmitted encrypted information, wherein the at least one receiving station comprises:
        a decryption device configured to decrypt the transmitted encrypted information using one of a rebuilt version of the first key and a key substantially identical to the first key, and
        means for generating the one of the rebuilt version of the first key and the key substantially identical to the first key using a second key transmitted from the transmitting station and at least one datum selected from a set of stored data,
    wherein the at least one datum is selected according to a selection signal transmitted by the transmitting station, wherein the selection command comprises a pointer referencing at least one memory address location of the at least one datum used to generate the one of the rebuilt first key and the key substantially identical to the first key.

9. The system according to claim 8, wherein the first key is an operating key and the encrypted information includes an access control message bearing a third key used for encrypting a data stream comprising audio and/or video data.

10. The system according to claim 8, wherein the first key is an encryption/decryption key for audio and/or video data, and wherein the encrypted information includes audio and/or video data.

11. The system according to claim 8, wherein each receiving station includes a rewritable memory for storing a set of data capable of being selected for establishing the first encryption key.

12. The system according to claim 8, wherein the transmitting station is a broadcasting station, and wherein the receiving stations are pay television receivers/decoders.

13. A receiving station for an information transmission system according to claim 8, comprising selection means sensitive to a selection command transmitted by a transmitting station for selecting one datum from a set of stored data.

14. The receiving station according to claim 13, wherein the selection means includes a table of pointers pointing to memory addresses.

15. The receiving station according to claim 13, wherein the set of stored data capable of being selected comprises data for identifying said receiving station.

16. The system of claim 8, wherein the set of stored data is located in the at least one receiving station and is periodically updated in the at least one receiving station such that the set of stored data from which the at least one datum is selected is periodically modified.

17. A receiving station for an information transmission system able to receive information encrypted by a first key, at least one message containing a second key and a selection signal, the receiving station comprising:
- a decryption device to decrypt the encrypted information, wherein the encrypted information is decrypted using one of a rebuilt version of the first key and a key substantially identical to the first key, and
- means for generating the rebuilt version of the first key using the second key and at least one datum selected from a set of stored data, wherein the at least one datum is selected according to the received selection signal, wherein the selection command comprises a pointer referencing at least one memory address location of the at least one datum used to generate the one of the rebuilt first key and the key substantially identical to the first key.

* * * * *